US011812687B2

(12) United States Patent
Gilpin (10) Patent No.: US 11,812,687 B2
(45) Date of Patent: Nov. 14, 2023

(54) LEAF MULCHER

(71) Applicant: Ash Gilpin, Virginia Beach, VA (US)

(72) Inventor: Ash Gilpin, Virginia Beach, VA (US)

( * ) Notice: Subject to any disclaimer, the term of this patent is extended or adjusted under 35 U.S.C. 154(b) by 223 days.

(21) Appl. No.: 17/124,590

(22) Filed: Dec. 17, 2020

(65) Prior Publication Data

US 2021/0195832 A1    Jul. 1, 2021

Related U.S. Application Data

(60) Provisional application No. 62/954,198, filed on Dec. 27, 2019.

(51) Int. Cl.
*A01D 34/00* (2006.01)
*A01G 20/47* (2018.01)
*A01D 42/00* (2006.01)
*B65F 1/10* (2006.01)

(52) U.S. Cl.
CPC ......... *A01D 34/005* (2013.01); *A01D 42/005* (2013.01); *A01G 20/47* (2018.02); *B65F 1/10* (2013.01)

(58) Field of Classification Search
CPC ........ A01G 20/47; A01G 20/40; A01G 20/43; B65F 1/10; A01D 34/005; A01D 42/005
See application file for complete search history.

(56) References Cited

U.S. PATENT DOCUMENTS

| | | | | |
|---|---|---|---|---|
| 2,720,346 A * | 10/1955 | Compton | ............... | B65D 25/48 222/570 |
| 3,877,207 A * | 4/1975 | Lemelson | ............. | E01H 1/0836 56/13.2 |
| 4,076,460 A * | 2/1978 | Roof | ....................... | F04D 17/16 415/121.2 |
| 4,150,796 A * | 4/1979 | Kudo | ................... | A01D 42/005 241/222 |
| 4,312,531 A * | 1/1982 | Cross | ....................... | E01H 1/12 15/257.1 |
| 4,629,233 A * | 12/1986 | Pfisterer | .................... | B65F 1/10 294/176 |
| 4,951,882 A * | 8/1990 | Ober | ....................... | B02C 18/22 241/154 |
| 5,107,666 A * | 4/1992 | Rahtican | ................ | A01D 51/00 248/101 |

(Continued)

OTHER PUBLICATIONS

Toro Comapny—"Ultra Blower/Vacuum" Model 51599, 2007.*

*Primary Examiner* — Thomas B Will
*Assistant Examiner* — Julia C Tran
(74) *Attorney, Agent, or Firm* — ALLEN, DYER ET AL.

(57) ABSTRACT

A leaf mulcher includes a carriage, a plurality of wheels rotatably secured to the carriage, and a main housing having a front and a rear. A scoop is removably coupled to the front of the main housing and configured to direct leaves into the main housing to be mulched. The leaf mulcher also includes an impeller housing having an entry and an exit, where the entry of the impeller housing is coupled to a rear of the housing. In addition, the leaf mulcher includes a bag having an intake conduit coupled to the exit of the impeller housing and is configured to receive mulched leaves, and an impeller is within the impeller housing and has an insert and nut. A motor is coupled to the impeller and is configured to spin the impeller to create a vacuum to draw leaves into the impeller housing where the leaves are mulched.

17 Claims, 9 Drawing Sheets

(56) References Cited

U.S. PATENT DOCUMENTS

| | | | | |
|---|---|---|---|---|
| 5,294,063 | A * | 3/1994 | Bote | B02C 18/06 |
| | | | | 241/101.1 |
| 5,340,035 | A * | 8/1994 | Ford | A01G 20/47 |
| | | | | 241/58 |
| 5,498,046 | A * | 3/1996 | Ridley, Sr. | B65F 1/10 |
| | | | | 15/257.1 |
| 5,560,078 | A * | 10/1996 | Toensing | A47L 9/0081 |
| | | | | 15/330 |
| 5,593,117 | A * | 1/1997 | Alexander, III | B65F 1/1415 |
| | | | | 383/33 |
| 5,860,606 | A * | 1/1999 | Tiedeman | B02C 18/2291 |
| | | | | 241/285.2 |
| 5,915,768 | A * | 6/1999 | Young | B65B 67/12 |
| | | | | 15/257.1 |
| 6,629,818 | B2 * | 10/2003 | Svoboda | A47L 5/14 |
| | | | | 415/206 |
| D567,465 | S * | 4/2008 | Lucker | A01G 20/47 |
| | | | | D34/6 |
| 7,762,052 | B2 | 7/2010 | Dunning et al. | |
| 9,247,690 | B1 * | 2/2016 | Awad | A01G 20/47 |
| 9,351,442 | B1 | 5/2016 | Cruz | |
| 9,480,383 | B2 * | 11/2016 | Wollman | A47L 13/52 |
| D802,865 | S * | 11/2017 | Dervin | B65F 1/10 |
| | | | | D34/10 |
| 10,029,849 | B1 * | 7/2018 | Genotti, III | B65F 1/10 |
| 10,301,109 | B2 * | 5/2019 | Dervin | A47L 13/52 |
| 10,645,885 | B2 * | 5/2020 | Harvey | B02C 18/2225 |
| 11,167,886 | B1 * | 11/2021 | Schuster | B65D 25/20 |
| 2006/0016167 | A1 | 1/2006 | Banowetz | |
| 2011/0260013 | A1 * | 10/2011 | Richardson | B65B 67/12 |
| | | | | 29/428 |
| 2011/0283474 | A1 * | 11/2011 | McCoy | B65F 1/10 |
| | | | | 15/257.1 |
| 2011/0297765 | A1 * | 12/2011 | Tulipani | A01G 20/47 |
| | | | | 241/62 |
| 2013/0175376 | A1 * | 7/2013 | Freakes | A01G 3/002 |
| | | | | 241/47 |
| 2016/0157686 | A1 * | 6/2016 | Bermudez | A01G 20/47 |
| | | | | 15/330 |
| 2016/0353668 | A1 * | 12/2016 | Mayer | A01G 20/47 |
| 2018/0009559 | A1 * | 1/2018 | Richison | B65F 1/10 |
| 2018/0042445 | A1 * | 2/2018 | Carcioppolo | B65F 1/10 |
| 2018/0057258 | A1 * | 3/2018 | Dervin | A47L 13/52 |

* cited by examiner

LEAF MULCHER

CROSS-REFERENCE TO RELATED APPLICATIONS

This application claims the benefit of U.S. provisional application No. 62/954,198 filed Dec. 27, 2019, which is hereby incorporated herein in its entirety by reference.

FIELD

The present invention relates to the field of lawn care, and, more particularly, to a leaf mulcher.

BACKGROUND

Deciduous trees shed their leaves each year, which can create a time-consuming task to clean up and bag the leaves for disposal. Accordingly, it is desirable that these leaves be disposed of in a more efficient and less time-consuming manner.

Some homeowners will use lawn mowers to pass over the leaves in an attempt to mulch them. However, the leaves are often wet and difficult for the lawn mower to dislodge from the lawn leaving the leaves behind. More complex powered accessories have been developed to attach to riding lawn mowers in an attempt to overcome the deficiencies. However, the powered accessories are expensive, difficult to attach and remove from the riding law mowers, and take up valuable space in a garage. In addition, these existing powered accessories use gasoline and are not environmentally friendly.

Accordingly, there is a need for an efficient, compact, and environmentally friendly leaf mulcher that is easy to use and store.

SUMMARY

A leaf mulcher is disclosed. The leaf mulcher includes a carriage, a plurality of wheels rotatably secured to the carriage, and a main housing having a front and a rear. The main housing is mounted to and carried by the carriage. The leaf mulcher also includes a scoop removably coupled to the front of the main housing and configured to direct leaves into the main housing to be mulched. The leaf mulcher includes an impeller housing having an entry and an exit, where the entry of the impeller housing is coupled to the rear of the main housing. In addition, the leaf mulcher includes a bag having an intake conduit coupled to the exit of the impeller housing and is configured to receive mulched leaves, and an impeller is within the impeller housing. A motor is secured to the impeller housing, where the motor is coupled to the impeller using an insert and nut and the motor is configured to spin the impeller to create a vacuum to draw leaves into the impeller housing where the leaves are mulched into pieces by the impeller.

The impeller has a front side and an opposing rear side, where the front side has a plurality of cutting blades of different sizes and shapes secured thereto configured to cut leaves, and the rear side has a plurality of fins all of the same size and shape configured to move air for cooling the motor. The motor may be an electric motor and further, a variable speed motor. The motor may also be battery powered. A switch may be coupled to the motor and be configured to vary the speed of the motor, and in turn, vary the speed of the impeller that is coupled to the motor.

The scoop may have a width wider than the main housing and be configured to direct leaves into the front of the main housing as a user rakes leaves up the scoop. The scoop slopes upwards from a ground surface up to the front of the main housing.

The front of the main housing includes an opening having a circular shape that narrows to a smaller opening having a circular shape at the rear. The smaller opening at the rear of the main housing may be concentrically aligned with the impeller. The front of the main housing may also include a circular lip to friction fit to the scoop. The bag may be a rigid container and comprise a porous material. The leaf mulcher may also include an adjustable handle rotatably mounted to the main housing and configured to be used by a user to pull the leaf mulcher.

In another particular aspect, a leaf mulcher includes a carriage, and a main housing having a front and a rear, where the main housing is mounted to and carried by the carriage. A scoop is removably coupled to the front of the main housing and is configured to direct leaves into the housing to be mulched. In addition, the leaf mulcher includes an impeller housing and has an entry and an exit, where the entry is coupled to the rear of the main housing. The leaf mulcher includes a bag having an intake conduit coupled to the exit of the impeller housing and is configured to receive mulched leaves, and an impeller within the impeller housing impeller has a front side and an opposing rear side, where the front side has a plurality of cutting blades of different sizes and shapes secured thereto configured to cut leaves, and the rear side having a plurality of fins all of the same size and shape configured to move air for cooling.

Other aspects, advantages, and features of the present disclosure will become apparent after review of the entire application, including the following sections: Brief Description of the Drawings, Detailed Description, and the Claims.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
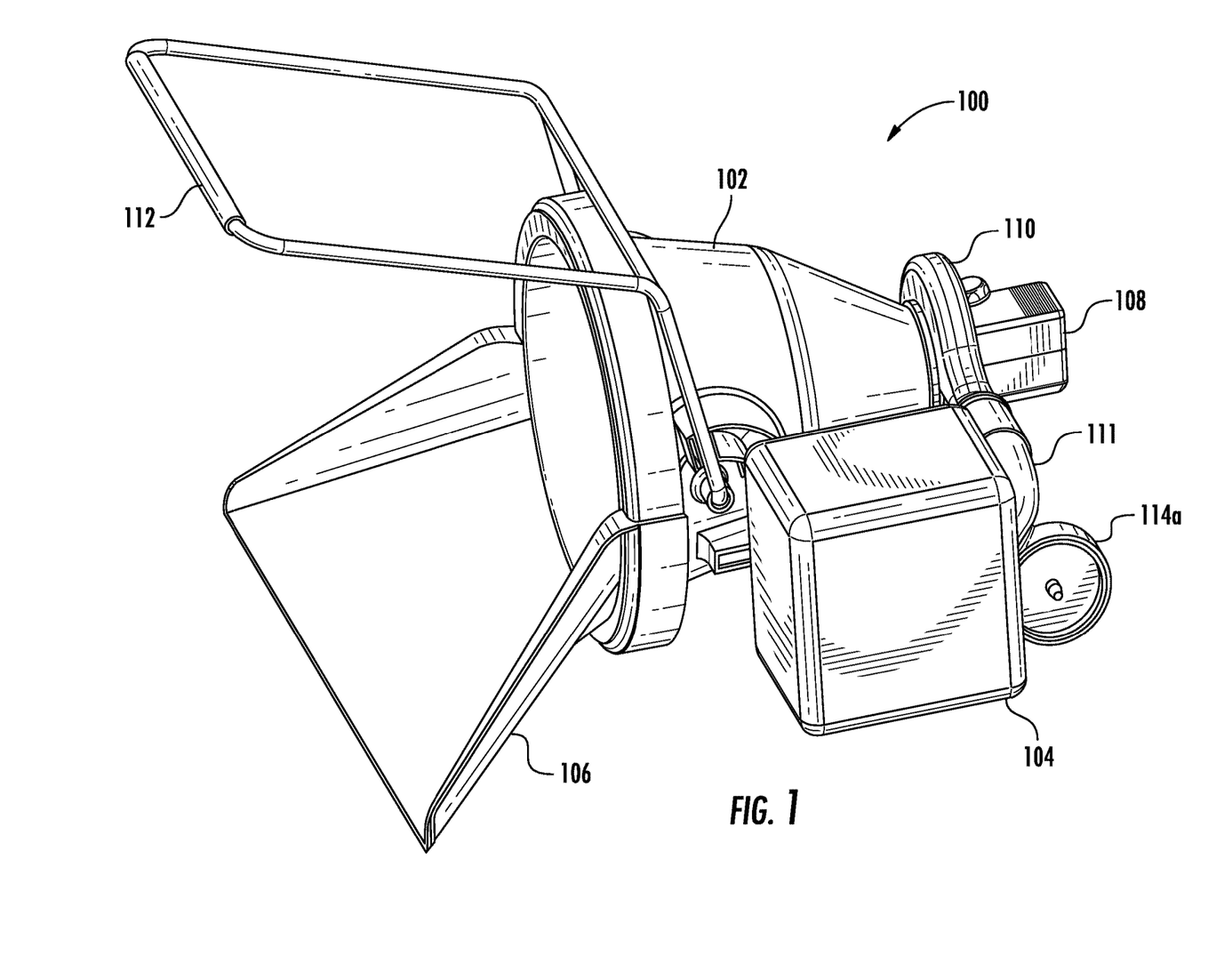
FIG. 1 is a perspective view of a leaf mulcher in which various aspects of the disclosure may be implemented.

Referring now to FIG. 1, a leaf mulcher, generally designated 100, includes a main housing 102 and a bag 104 or other similar type receptacle for receiving the mulched leaves. A scoop 106 on the front of the main housing 102 is used to direct the leaves being raked into the main housing 102 to be mulched.

An advantage of the leaf mulcher 100 is that it is orientated to be fed with the leaves from the side, rather than from the top as in typical stand-alone leaf mulchers. Thus, there is no need to bend over and pick up leaves or getting your hands dirty in order to feed the leaf mulcher 100. The scoop 106 is wide and funnels the leaves up into the main housing 102 to be mulched. In addition, wheels 114a, 114b make the leaf mulcher 100 portable and easy to move around the yard to wherever the piles of leaves may be located.

A motor 108 is secured to an impeller housing 110 at a rear portion of the main housing 102. The impeller housing 110 comprises an upper portion 110a and a lower portion 110b. The motor 108 is coupled to an impeller 122 (see FIG. 2) and is used to spin the impeller 122 to create a vacuum to help draw leaves through the main housing 102 and into the impeller housing 110 to mulch (cut into tiny pieces) the leaves. A switch 118 is used to vary the speed of the motor 108, and in turn the impeller 122 that is coupled to the motor 108 via insert 120 and nut 124.

An intake conduit 111 of the bag 104 is coupled to an outlet of the impeller housing 110 in order to collect the mulched leaves into the bag 104. An adjustable handle 112 is rotatably mounted to the main housing 102 and is used by the user to pull the leaf mulcher 100. The handle 112 may also be telescopic and configured to extend and retract from the main housing 102. The main housing 102 is mounted to wheels 114a, 114b via the carriage 116 that allows the leaf mulcher 100 to be easily pulled over the terrain.

Figure 2:
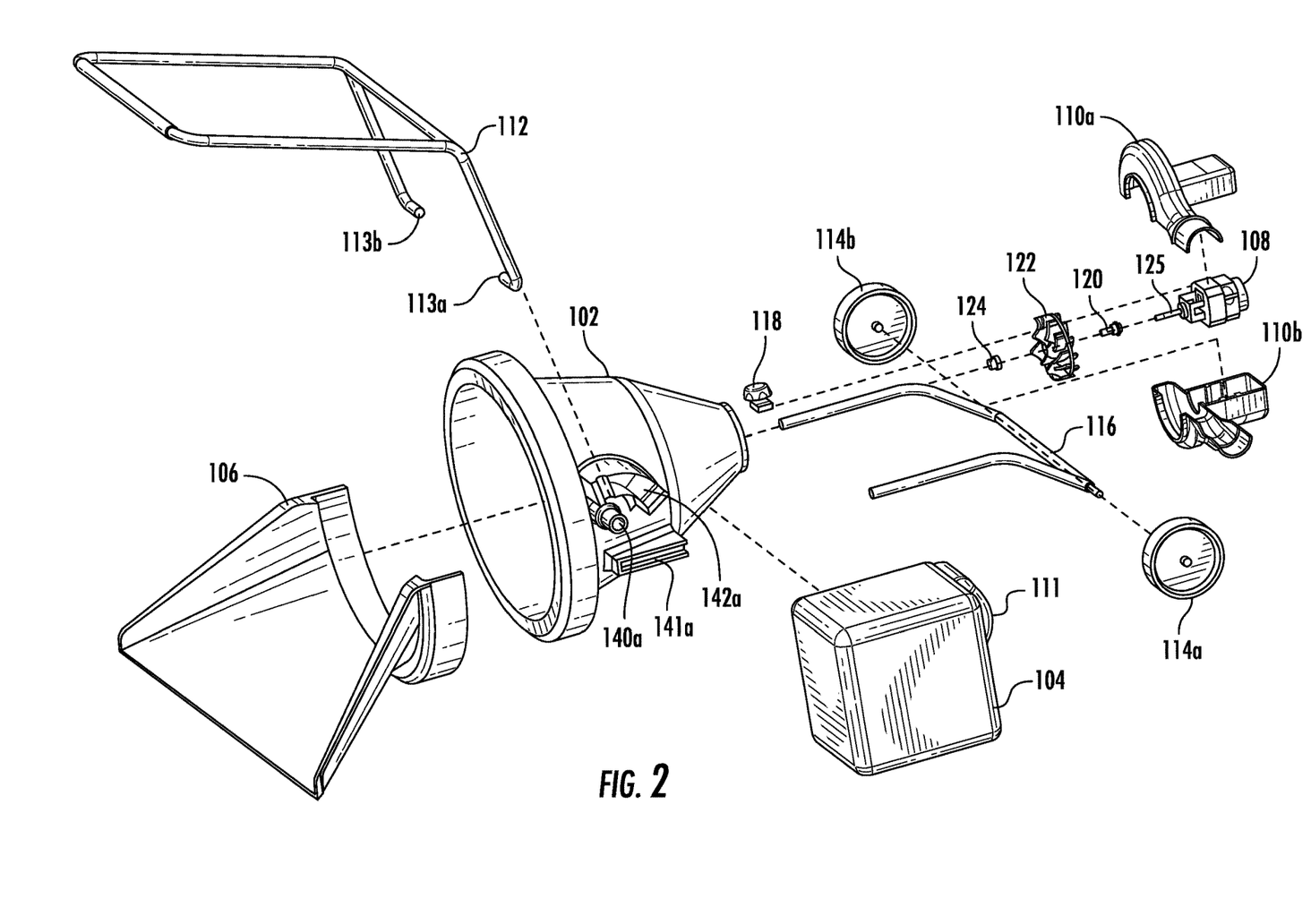
FIG. 2 is an exploded view of the leaf mulcher of FIG. 1.
Figure 3:
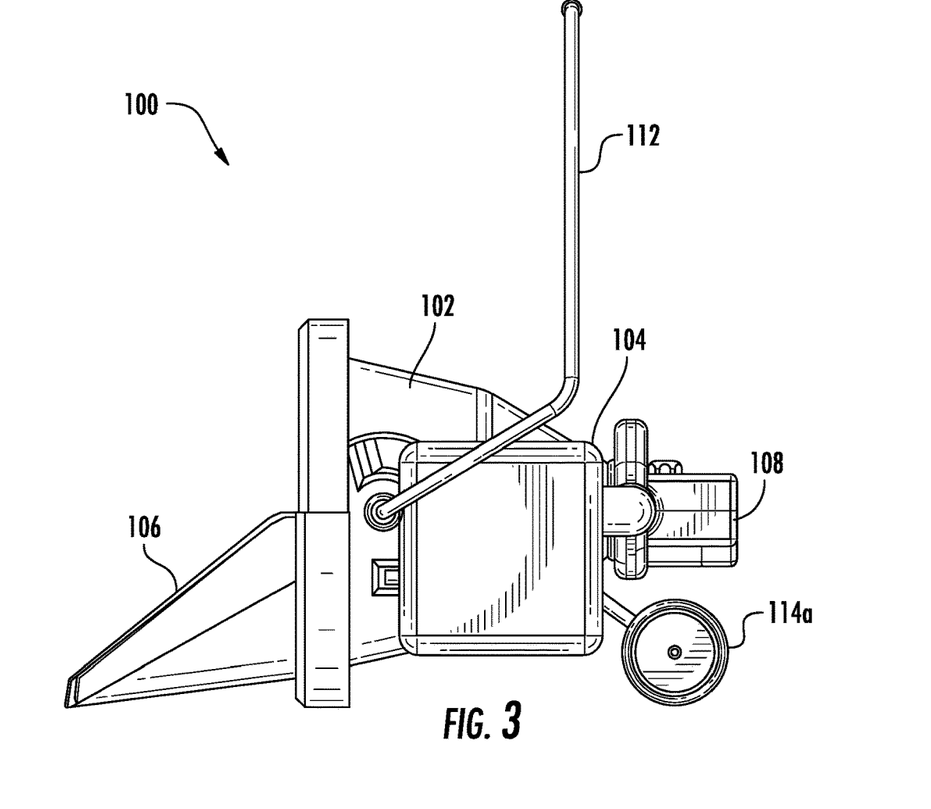
FIG. 3 is a side view of the leaf mulcher.
Figure 4:
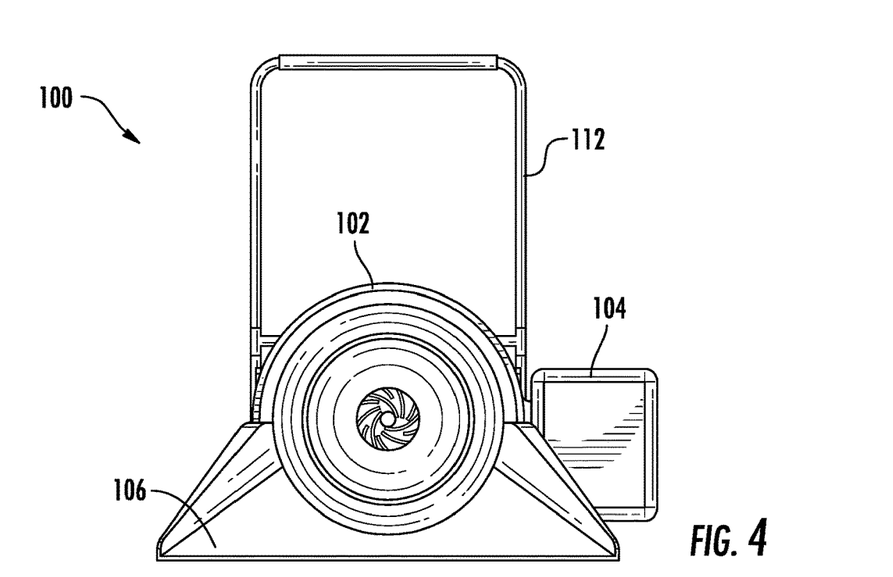
FIG. 4 is a front view of the leaf mulcher.
Figure 5:
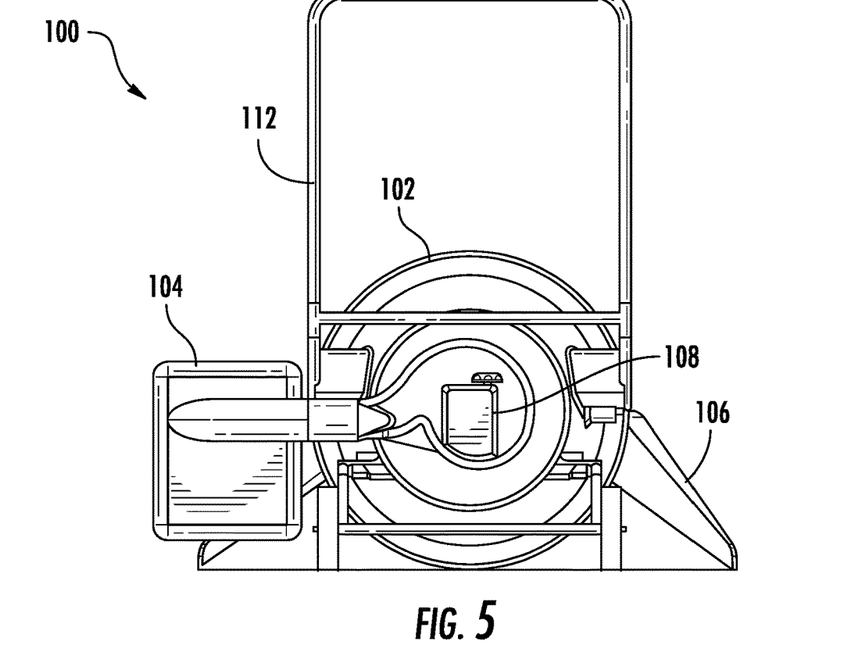
FIG. 5 is a rear view of the leaf mulcher.
Figure 6:
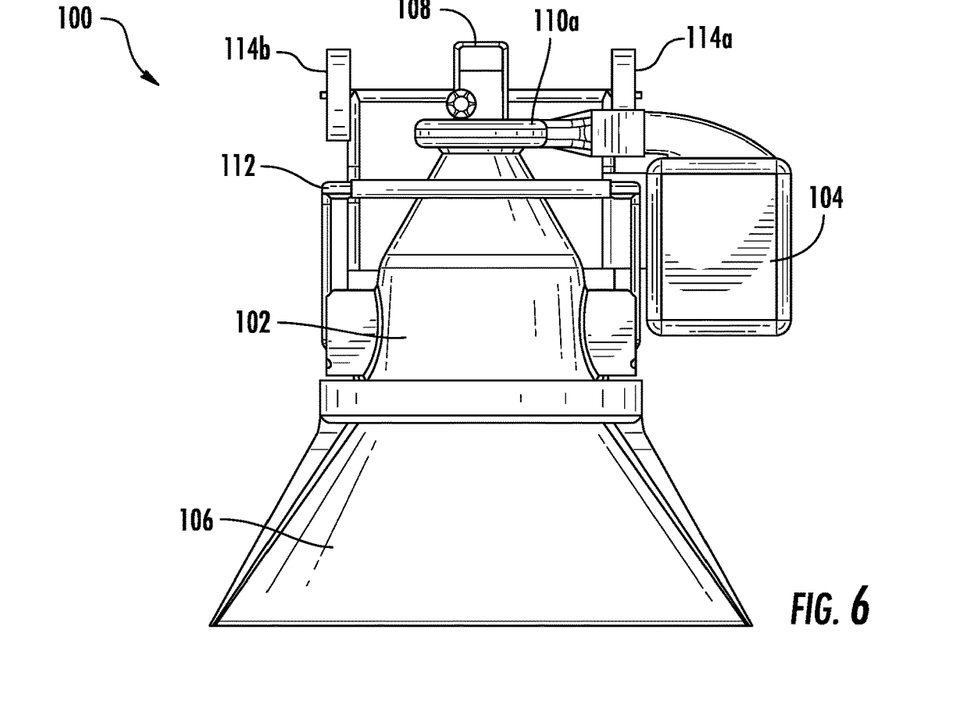
FIG. 6 is a top view of the leaf mulcher.

Referring now to FIG. 2, an exploded view of the leaf mulcher 100 is depicted. In particular, the scoop 106 includes a semi-circular lip that is configured to friction fit to a circular lip of the main housing 102. Accordingly, the scoop 106 can be removed when not in use in order to reduce the size of the foot print of the leaf mulcher 100 for storage.

The carriage 116 has a first end that is configured to slide into slots 141a, 141b on opposing sides of the housing 102. Wheels 114a, 114b are disposed on a second end of the carriage 116 so that the leaf mulcher can be rolled and moved easily. The handle 112 includes pins 113a, 113b that are configured to slide into apertures 140a, 140b, respectively. This allows the handle 112 to be rotated about the housing 102. Locking slots 142a, 142b on opposing sides of the main housing 102 are used to secure the handle 112 in the desired position.

The impeller housing 110 includes an upper portion 110a, and a lower portion 110b. The impeller 122 is secured within the impeller housing 110 and is coupled to a shaft 125 of the motor 108 using an insert 120 and a nut 124. The insert 120 has two flat sides, which mate to the impeller opening 150, so that the impeller 122 rotates without slipping.

Referring now to FIGS. 3-6, the leaf mulcher 100 is depicted in a mulching position. In other words, the handle 112 is positioned vertically and the scoop 106 is resting on a ground surface ready for leaves to be raked on to it and up into the main housing 102. The motor 108 can be switched on to start spinning the impeller 122 as described above and will draw leaves into the impeller housing 110.

Figure 7:
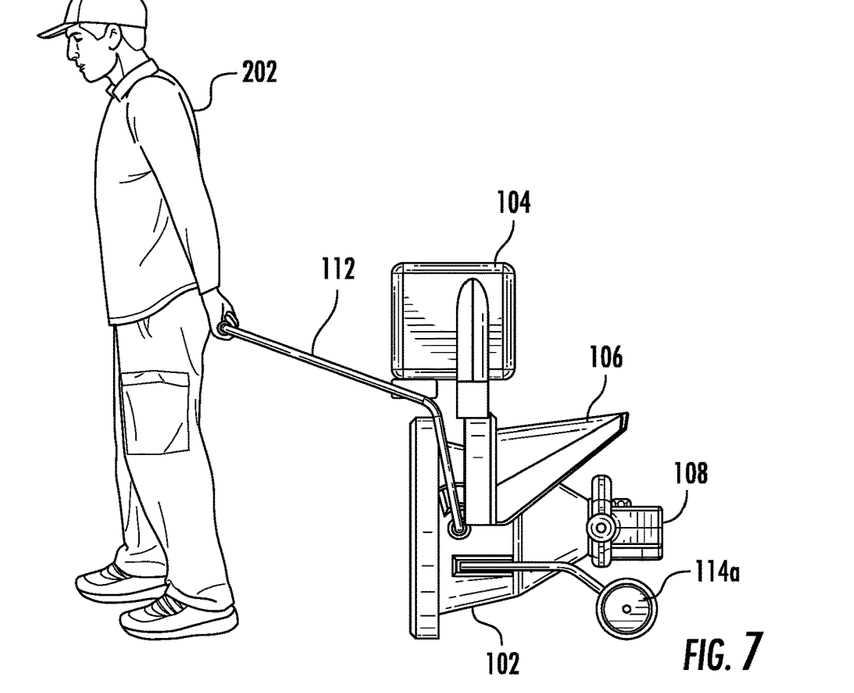
FIG. 7 illustrates the leaf mulcher in a transport mode and being pulled by a user.
Figure 8:
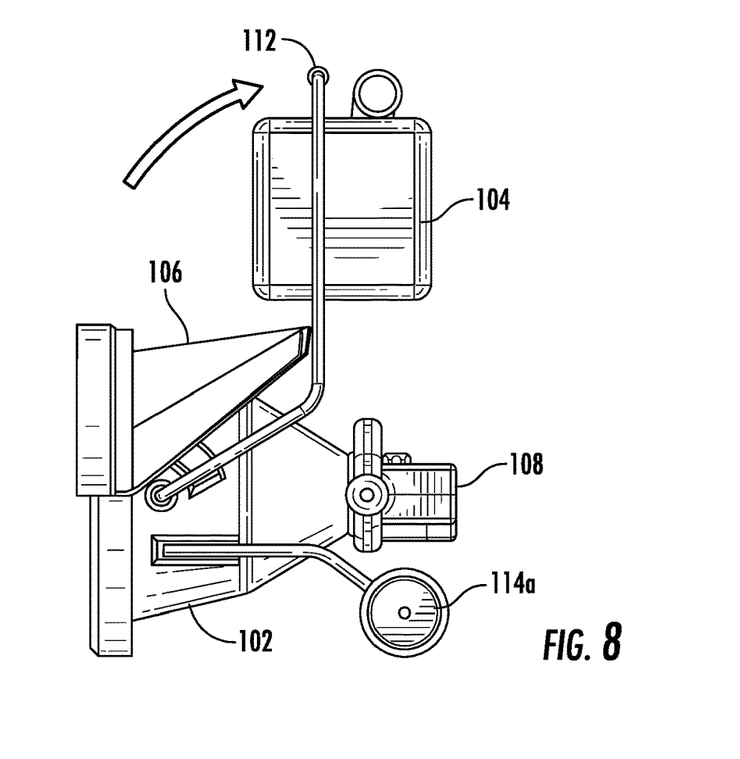
FIG. 8 illustrates a handle and bag of the leaf mulcher in a stored position.

Referring now to FIG. 7, the handle 112 has been lowered into a transporting position. In addition, the scoop 106 has been removed from the bottom portion of the main housing 102, and reversed to snap on to the top portion of the main housing 102. FIG. 8 depicts that the handle 112 has been moved into a stowed position and the bag 104 has been disconnected from the impeller housing 110 and snapped to the handle 112. Thus, the footprint of the leaf mulcher (length and width) has been reduced significantly in order to more easily store in a garage, for example.

Figure 9:
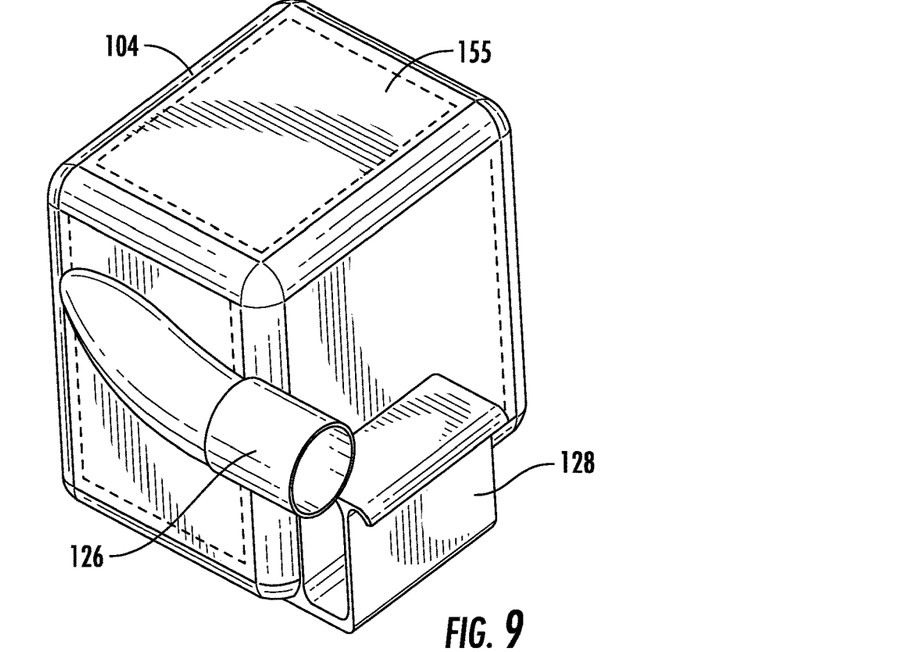
FIG. 9 is a detailed view of the bag of the leaf mulcher.

FIG. 9 shows the bag 104 in more detail. The intake conduit 126 is used to connect the bag 104 to an exit of the impeller housing 110. The mulched leaf pieces are blown into the bag 104. The bag 104 may be rigid or may be flexible. The bag 104 may include a liner 155 that can be removed an emptied or discarded and placed back into the bag 104. As those of ordinary skill in the art can appreciate, the bag 104 may be porous to allow air to blow through but also to retain the mulched leaf pieces. A bracket 128 is used to couple the bag 104 to the main housing 102.

Figure 10:
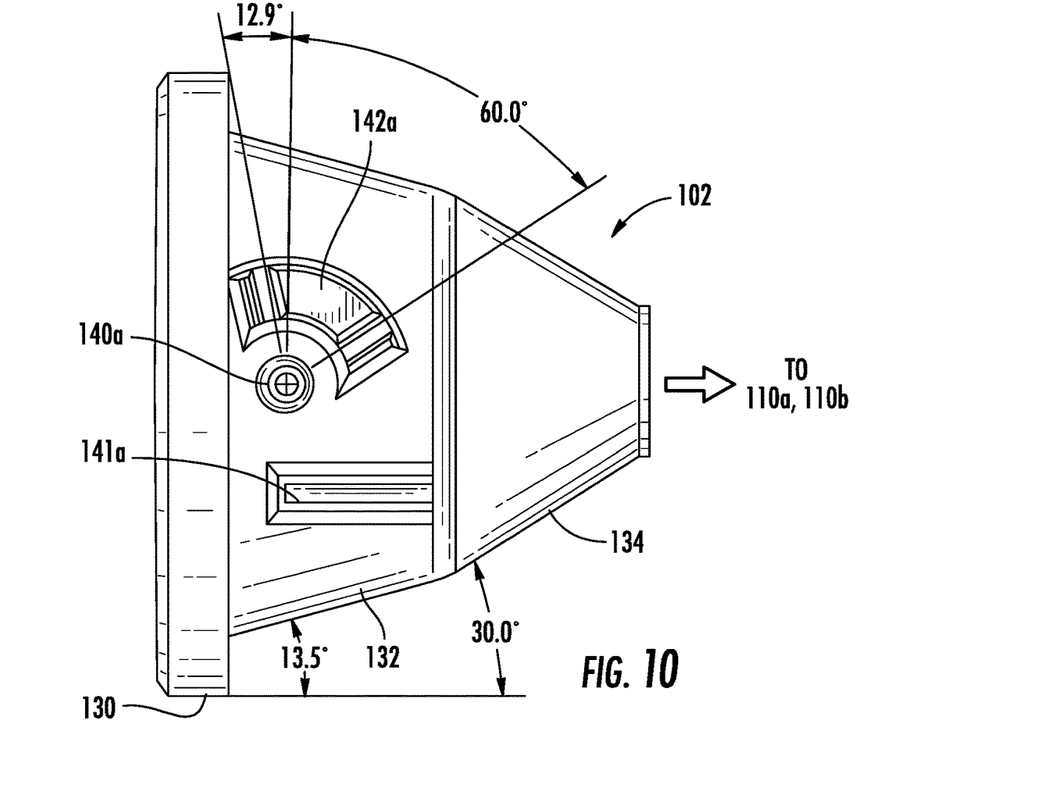
FIG. 10 is a side view of a housing of the leaf mulcher.

Referring now to FIG. 10, the main housing 102 is shown in more detail. In particular, the circular lip 130 is shown that is used to secure the scoop 106. The locking slots 142a, 142b may be arced shaped so that the handle 112 can be rotated about apertures 140a, 140b, respectively, and held at the desired angle.

The main housing 102 also has a unique shape that is designed to allow the maximum amount of leaves to be raked into a first portion as the main housing narrows 102 more rapidly closer to the impeller housing 110. In a particular aspect the first portion 132 has a slope of about 13.5 degrees, and a second portion 134 has a slope of about 30 degrees, relative to horizontal reference. The handle 112 is configured to be rotated about sixty degrees between the transporting position and the stowed position using the locking slots 142a, 142b.

Figure 11:
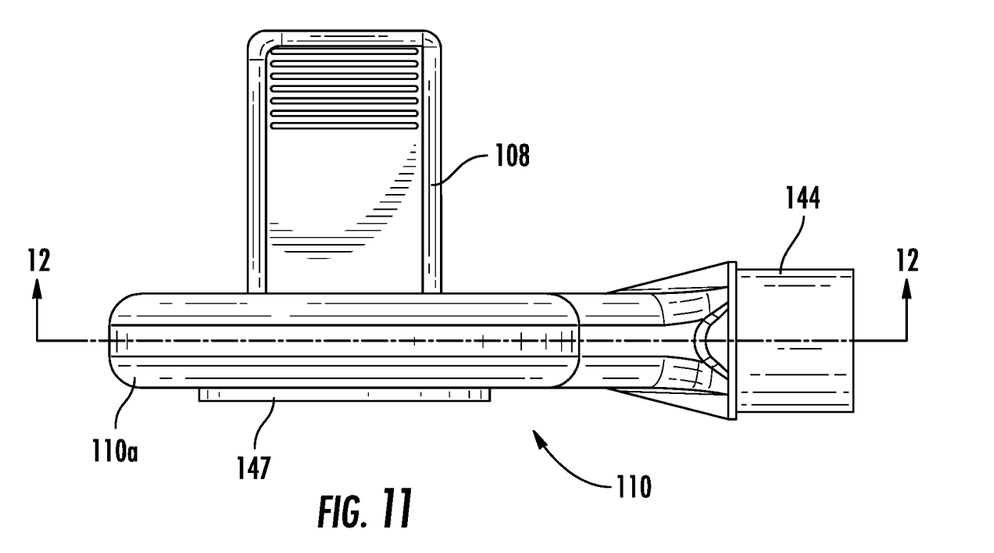
FIG. 11 is a top view of an impeller housing and motor of the leaf mulcher.

Referring now to FIG. 11, the impeller housing 110 includes the motor 108 mounted to a rear side. The shaft of the motor 108 is coupled to the impeller 122 as described above. The impeller housing 110 includes an inlet 147 that draws the leaves into the impeller 122, which chops them into pieces, then blows the pieces out an impeller housing outlet 144. The impeller housing outlet 144 is removably coupled to the bag inlet conduit 126.

Figure 12:
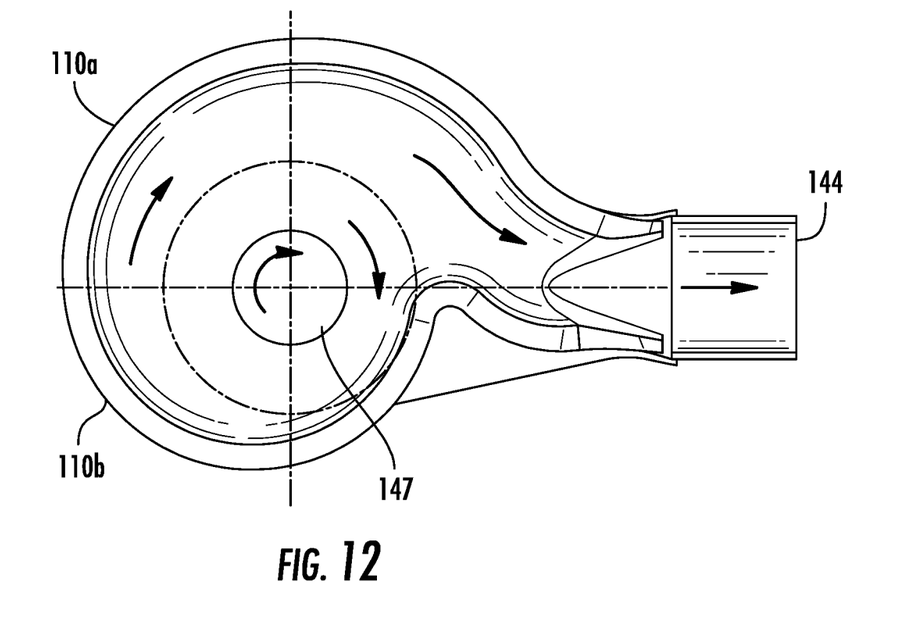
FIG. 12 is a cross sectional view of the impeller housing of FIG. 11.
Figure 13:
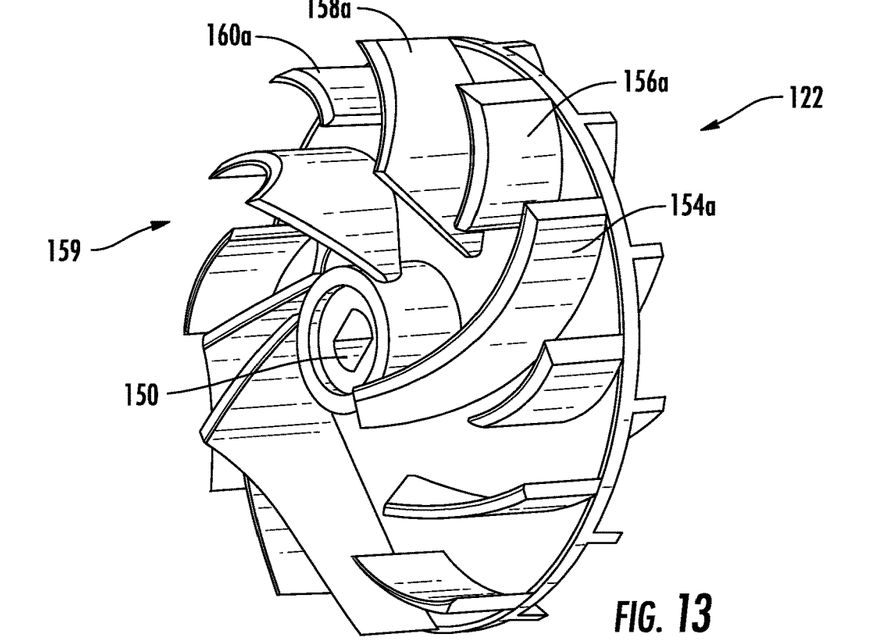
FIG. 13 is a front perspective view of an impeller of the leaf mulcher.
Figure 14:
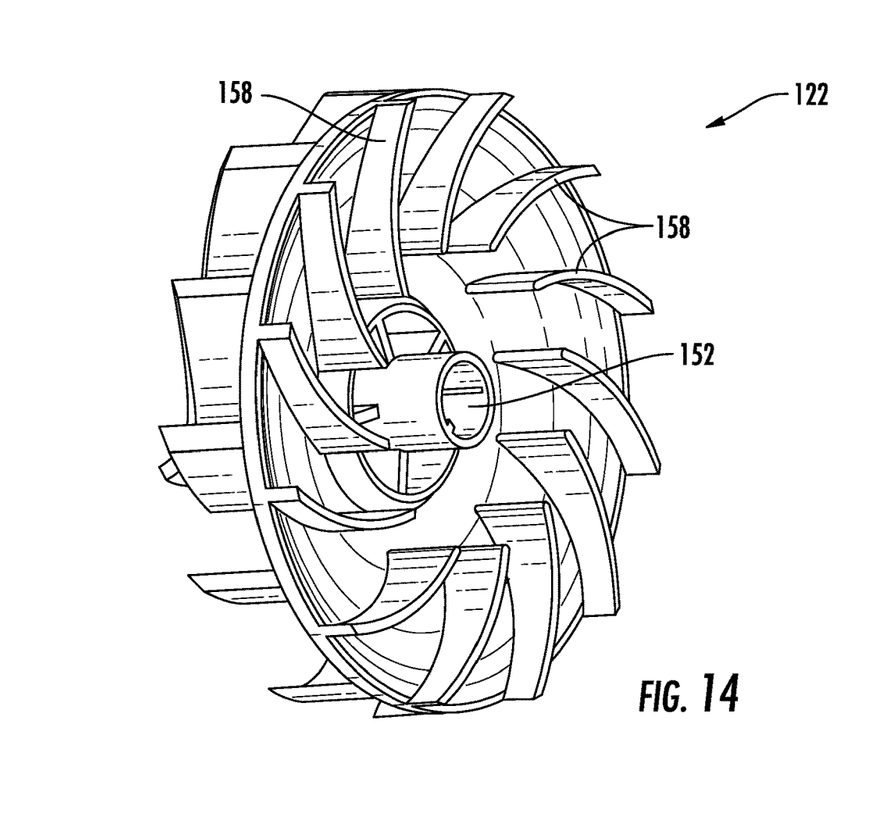
FIG. 14 is a rear perspective view of the impeller of FIG. 13.
Figure 15:
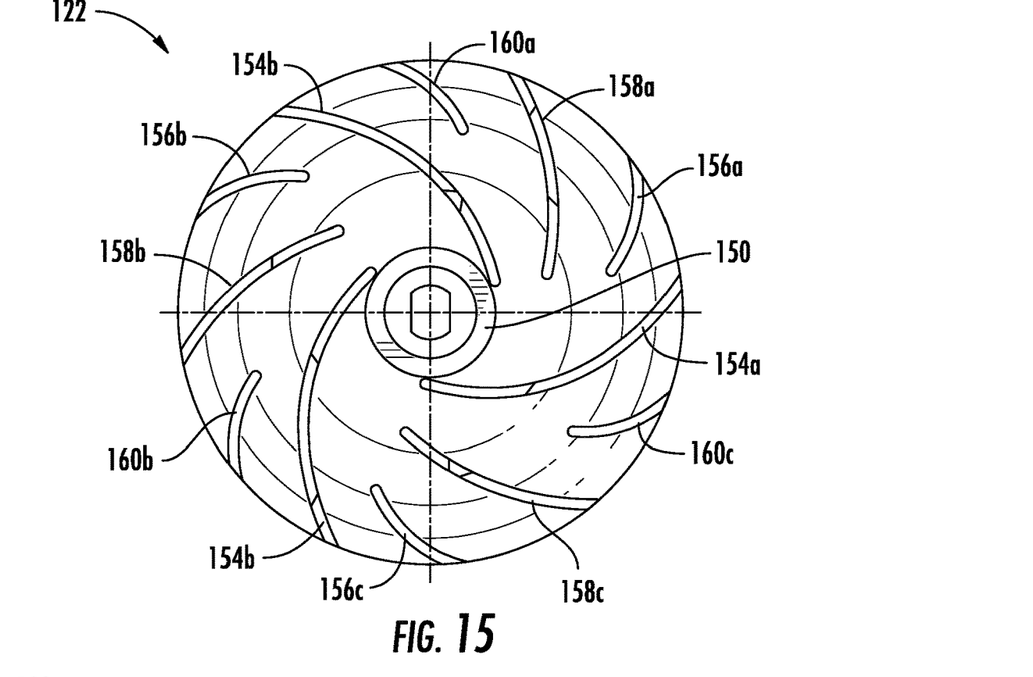
FIG. 15 is a front view of the impeller.
Figure 16:
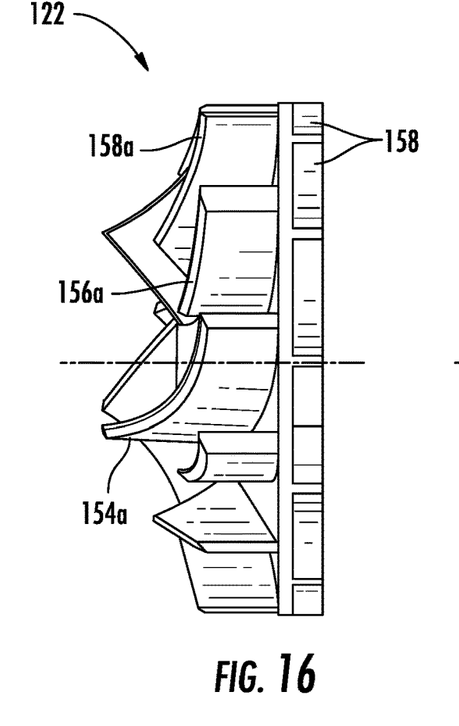
FIG. 16 is a profile view of the impeller.
Figure 17:
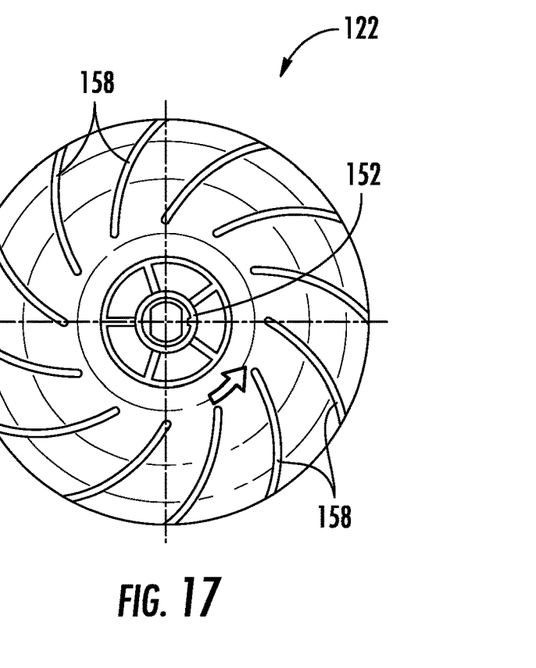
FIG. 17 is a rear view of the impeller.

The flow through the impeller housing 110 is illustrated in FIG. 12. In particular, the flow begins at the inlet 147 and spirals outwards until blown out through the impeller housing outlet 144 and into the bag 104.

The shape and size of the impeller as shown in FIGS. 13-17 is critical to the function of the leaf mulcher 102. For example, the impeller 122 includes a plurality of cutting blades 159 on one side, and a plurality of fins 158 on the other side. The fins 158 are configured to function as a fan and to blow air to cool the motor 108. The plurality of cutting blades 159 include three sets of four different sizes and positioned cutting blades 154a, 156a, 158a, 160a; 154b, 156b, 158b, 160b; 154c, 156c, 158c, 160c.

The shaft 125 of the motor 108 passes through the center 152 of the impeller 122 and is secured to the impeller opening 152 using the insert 120 and nut 124. Accordingly, as the shaft 125 rotates in a counter-clockwise direction, for example, the plurality of cutting blades 159 on the opposing side rotate in a clockwise direction. The rotation of the plurality of cutting blades 159 generates the low pressure at the entry 147 the impeller housing 110 in order to draw leaves into the impeller 122.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined herein.

That which is claimed is:

1. A leaf mulcher comprising:
a carriage;
a plurality of wheels rotatably secured to the carriage;
a main housing having a front and a rear, the main housing mounted to and carried by the carriage and the front of the main housing comprising an opening having a circular shape that narrows along a length of the main housing to a smaller opening having a circular shape at the rear;
a scoop removably coupled directly to the front of the main housing and configured to direct leaves into the main housing to be mulched, wherein the scoop comprises a width wider than the main housing and is configured to direct leaves into the front of the main housing as a user rakes leaves up the scoop;
an impeller housing having an entry and an exit, the entry coupled to the rear of the main housing;
a bag having a bracket coupling the bag to the main housing, and an intake conduit coupled to the exit of the impeller housing configured to receive mulched leaves, wherein the bag is coupled to the length between the front and the rear of the main housing for support;
an impeller within the impeller housing and having an insert and nut; and
a motor secured to the impeller housing and coupled to the impeller using the insert and nut, the motor configured to spin the impeller to create a vacuum to draw leaves through the main housing and into the impeller housing where the leaves are mulched into pieces by the impeller.

2. The leaf mulcher of claim 1, wherein the impeller having a front side and an opposing rear side, the front side having a plurality of cutting blades of different sizes and shapes secured thereto configured to cut leaves, and the rear side having a plurality of fins all of the same size and shape configured to move air for cooling the motor.

3. The leaf mulcher of claim 1, wherein the motor is a variable speed motor.

4. The leaf mulcher of claim 3, further comprising a switch coupled to the motor and configured to vary the speed of the motor, and to vary the speed of the impeller that is coupled to the motor.

5. The leaf mulcher of claim 1, wherein the scoop slopes upwards from a ground surface up to the front of the main housing.

6. The leaf mulcher of claim 1, wherein the smaller opening at the rear of the main housing is concentrically aligned with the impeller.

7. The leaf mulcher of claim 1, wherein the front of the main housing further comprises a circular lip to friction fit to the scoop.

8. The leaf mulcher of claim 1, wherein the bag comprises a rigid container.

9. The leaf mulcher of claim 1, further comprising an adjustable handle rotatably mounted to the main housing and configured to be used by a user to pull the leaf mulcher.

10. The leaf mulcher of claim 9, wherein the bag further comprises a porous material.

11. The leaf mulcher of claim 1, wherein the motor comprises an electric motor.

12. The leaf mulcher of claim 1, wherein the motor comprises a battery powered motor.

13. A leaf mulcher comprising:
a carriage;
a main housing having a front and a rear, the main housing mounted to and carried by the carriage and the front of the main housing comprising an opening having a circular shape that narrows along a length of the main housing to a smaller opening having a circular shape at the rear;
a scoop removably coupled directly to the front of the main housing and configured to direct leaves into the main housing to be mulched, the scoop comprises a width wider than the main housing and is configured to direct leaves into the front of the main housing as a user rakes leaves up the scoop;
an impeller housing having an entry and an exit, the entry coupled to the rear of the main housing;
a bag having a bracket coupling the bag to the main housing, and an intake conduit coupled to the exit of the impeller housing configured to receive mulched leaves, wherein the bag is coupled to the length between the front and the rear of the main housing for support; and
an impeller within the impeller housing impeller having a front side and an opposing rear side, the front side having a plurality of cutting blades of different sizes and shapes secured thereto configured to cut leaves, and the rear side having a plurality of fins of the same size and shape configured to move air for cooling.

14. The leaf mulcher of claim 13, further comprising a motor secured to the impeller housing and configured to spin the impeller to create a vacuum to draw leaves through the main housing and into the impeller housing where the leaves are mulched into pieces by the impeller.

15. The leaf mulcher of claim 14, wherein the motor is a variable speed motor.

16. The leaf mulcher of claim 13, wherein the main housing is concentrically aligned with the impeller.

17. A leaf mulcher comprising:
a carriage;
a plurality of wheels rotatably secured to the carriage;
a main housing having a front and a rear and mounted to and carried by the carriage, the front of the main housing comprises an opening having a circular shape that narrows along a length of the main housing to a smaller opening having a circular shape at the rear;
a scoop removably coupled directly to the front of the main housing, the scoop comprises a width wider than the main housing and is configured to direct leaves into the front of the main housing as a user rakes leaves up the scoop;
an impeller housing having an entry and an exit, the entry coupled to the rear of the main housing;
a bag having a bracket coupling the bag to the main housing, and an intake conduit coupled to the exit of the impeller housing configured to receive mulched leaves, wherein the bag is coupled to the length between the front and the rear of the main housing for support;

an impeller within the impeller housing and having a front side and an opposing rear side, the impeller concentrically aligned with the main housing, and the front side of the impeller having a plurality of cutting blades of different sizes and shapes secured thereto configured to cut leaves, and the rear side having a plurality of fins of the same size and shape configured to move air for cooling;

a motor coupled to the impeller and configured to spin the impeller to create a vacuum to draw leaves through the main housing into the impeller housing where the leaves are mulched into pieces by the impeller; and an adjustable handle rotatably mounted to the main housing and configured to be used by a user to pull the leaf mulcher.

* * * * *